(12) United States Patent
Noda

(10) Patent No.: US 7,443,336 B2
(45) Date of Patent: Oct. 28, 2008

(54) IN-VEHICLE PULSE RADAR DEVICE

(75) Inventor: Shinsaku Noda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 109 days.

(21) Appl. No.: 11/400,524

(22) Filed: Apr. 10, 2006

(65) Prior Publication Data

US 2008/0238761 A1 Oct. 2, 2008

(30) Foreign Application Priority Data

Nov. 22, 2005 (JP) .............. 2005-336754

(51) Int. Cl.
*G01S 13/10* (2006.01)
*G01S 7/28* (2006.01)
*G01S 7/285* (2006.01)
*G01S 13/93* (2006.01)
*G01S 13/00* (2006.01)

(52) U.S. Cl. ............... 342/135; 342/27; 342/70; 342/118; 342/134; 342/175; 342/195

(58) Field of Classification Search ........ 342/70–72, 342/27, 28, 89–97, 118, 128–145, 175, 194–197, 342/82; 180/167–169; 701/300, 301
See application file for complete search history.

(56) References Cited

U.S. PATENT DOCUMENTS 3,725,925 A * 4/1973 Holmgren ............... 342/204
4,002,932 A * 1/1977 Zaslav ................... 342/204
5,389,931 A * 2/1995 Anderson et al. ............ 342/70
5,724,041 A * 3/1998 Inoue et al. ................ 342/70
5,920,282 A * 7/1999 Vik et al. ................. 342/204

FOREIGN PATENT DOCUMENTS

| JP | 9-243738 A | 9/1997 |
| JP | 09-243738 A | 9/1997 |
| JP | 11-281744 A | 10/1999 |
| JP | 11-352219 A | 12/1999 |
| JP | 2000-338228 A | 12/2000 |

OTHER PUBLICATIONS

Japanese Office Action 2005-336754 of May 30, 2008.

* cited by examiner

*Primary Examiner*—Bernarr E Gregory
(74) *Attorney, Agent, or Firm*—Sughrue Mion, PLLC

(57) ABSTRACT

Provided is an in-vehicle pulse radar device capable of calculating a distance to a target object based on a delay time between a transmission pulse wave and a received signal. The in-vehicle pulse radar device includes: a reception control unit for controlling passing and blocking of the received signal in synchronization with the transmission pulse wave; a shaping unit for shaping the trailing edge of a pulse wave of the received signal to be delayed; and a sampling unit for sampling the received signal when a predetermined period of time elapses after the reception control unit starts to pass the received signal therethrough.

9 Claims, 6 Drawing Sheets

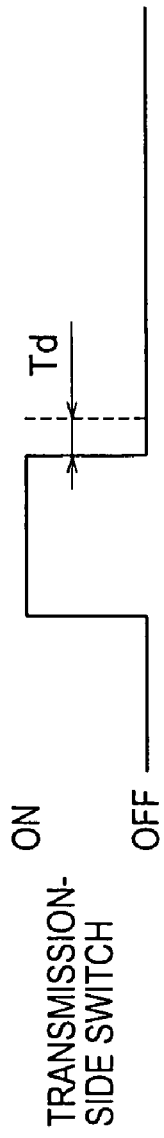
FIG. 2A TRANSMISSION-SIDE SWITCH
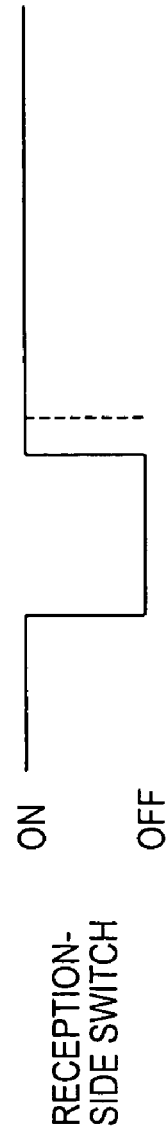
FIG. 2B RECEPTION-SIDE SWITCH
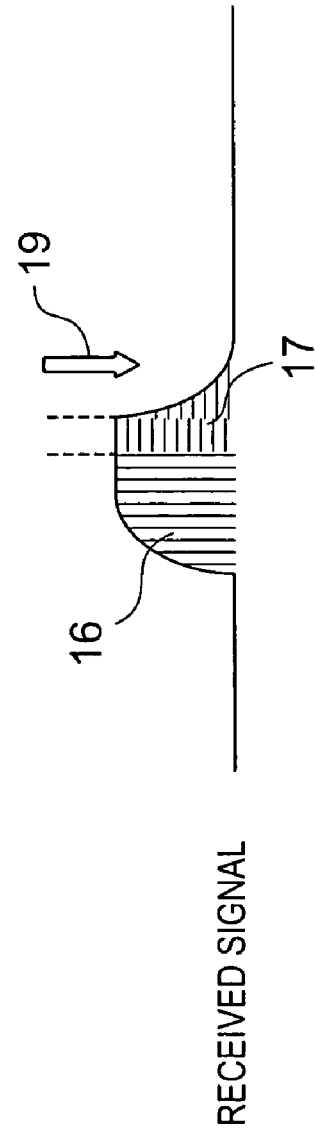
FIG. 2C RECEIVED SIGNAL
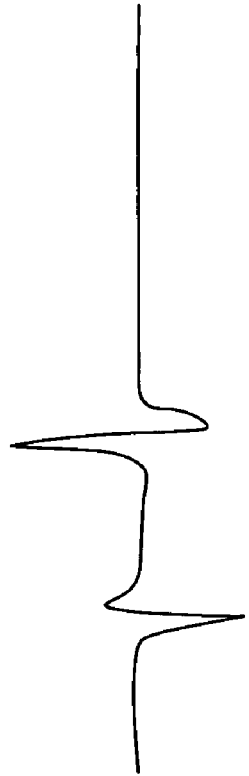
FIG. 2D SWITCHING NOISE

FIG. 4A  TRANSMISSION AND RECEPTION CHANGEOVER SWITCH

FIG. 4B  RECEIVED SIGNAL

FIG. 4C  SWITCHING NOISE

IN-VEHICLE PULSE RADAR DEVICE

BACKGROUND OF THE INVENTION

1. Field of the Invention

The present invention relates to an in-vehicle pulse radar device for measuring a distance to a neighboring vehicle, a relative speed thereof, etc. for the purposes of car-to-car distance control, collision damage mitigation, and the like.

2. Description of the Related Art

Conventionally, for such in-vehicle pulse radar devices, a millimeter wave in the 76 GHz band is used as a transmission wave. In a case of using such a high frequency wave, there is a problem in that since isolation is hardly secured between elements or lines in general, the transmission pulse wave is directly superimposed on a receiving circuit. This leads to a saturation of the receiving circuit, thereby preventing a proper detection operation.

To solve such a problem, there has been proposed a radar apparatus in which a transmission signal is prevented from being superimposed on a received signal (for example, refer to JP 09-243738 A). In the radar apparatus, a frequency modulation control signal is input to a voltage control oscillator, and a transmission signal that is frequency-modulated is supplied to a transmission and reception antenna via an antenna sharing unit to be transmitted toward a target object as a radio wave. The transmitted radio wave is reflected by the target object and is received by the transmission and reception antenna. A mixer mixes the received signal with the transmission signal that is output from the voltage control oscillator and outputs a beat signal. Since a method of calculating a distance to the target object based on the beat signal is similar to that of general FMCW radars, a detailed description thereof is omitted.

In the conventional radar apparatus, time-division transmission and reception is carried out to avoid the above-mentioned superimposition of the transmission signal on the received signal. A transmission-side switch is provided between the voltage control oscillator and the antenna sharing unit, and a reception-side switch is provided between the antenna sharing unit and the mixer. The transmission-side switch is controlled by a transmission and reception control oscillator. The reception-side switch is controlled, through an inverter, so as to be turned off when the transmission-side switch is turned on (at a time of transmission), and to be turned on when the transmission-side switch is turned off (at a time of reception).

A signal is received with a delay time of Td=2R/c (c indicates the speed of light) corresponding to a distance R to the target object, from the transmission pulse wave generated by the transmission-side switch. Practically, due to a function of the reception-side switch, a signal is not received in a signal-receiving period when the transmission-side switch is turned on, but received only in the delay time after the transmission-side switch is turned off. As described above, the target object is detected in a state where the transmission signal is prevented from being superimposed on the received signal.

However, in a case where a circuit is actually configured by using the above-mentioned conventional radar apparatus, a switching noise is generated due to an influence of charging and discharging in a switch element when the reception-side switch is switched on and off, and in particular, a received signal corresponding to a target object existing in a short distance is disturbed in the above-mentioned signal-receiving period, whereby the short-distance detection capability is lowered or short-distance detection is disabled.

SUMMARY OF THE INVENTION

The present invention has been made to solve the above problem, and has an object to provide an in-vehicle pulse radar device capable of appropriately detecting a target object in a short distance without imposing an unnecessary restriction on isolation within a circuit, even under the influence of a switching noise generated from a switching element.

The present invention provides an in-vehicle pulse radar device in which a transmission signal is converted to a transmission pulse wave by use of a predetermined on time and off time, the transmission pulse wave is transmitted from a transmission antenna toward a target object, a signal reflected by the target object is received by a reception antenna, and a distance to the target object is calculated based on a delay time between the transmission pulse wave and the signal received by the reception antenna. The in-vehicle pulse radar device includes: a reception control unit for controlling passing and blocking of the received signal in synchronization with the transmission pulse wave; a shaping unit for shaping a trailing edge of a pulse wave of the received signal to be delayed; and a sampling unit for sampling the received signal when a predetermined period of time elapses after the reception control unit starts to pass the received signal therethrough.

According to the present invention, it is possible to provide a low-cost in-vehicle pulse radar device in which isolation in a circuit does not need to be unnecessarily improved, and to appropriately detect a target object in a short distance without being affected by a switching, noise generated from a reception control unit.

BRIEF DESCRIPTION OF THE DRAWINGS

In the accompanying drawings:

FIGS. 2A to 2D are waveform charts of respective switches shown in FIG. 1, a received signal, and a switching noise;

DETAILED DESCRIPTION OF THE PREFERRED EMBODIMENTS

First Embodiment

Figure 1:
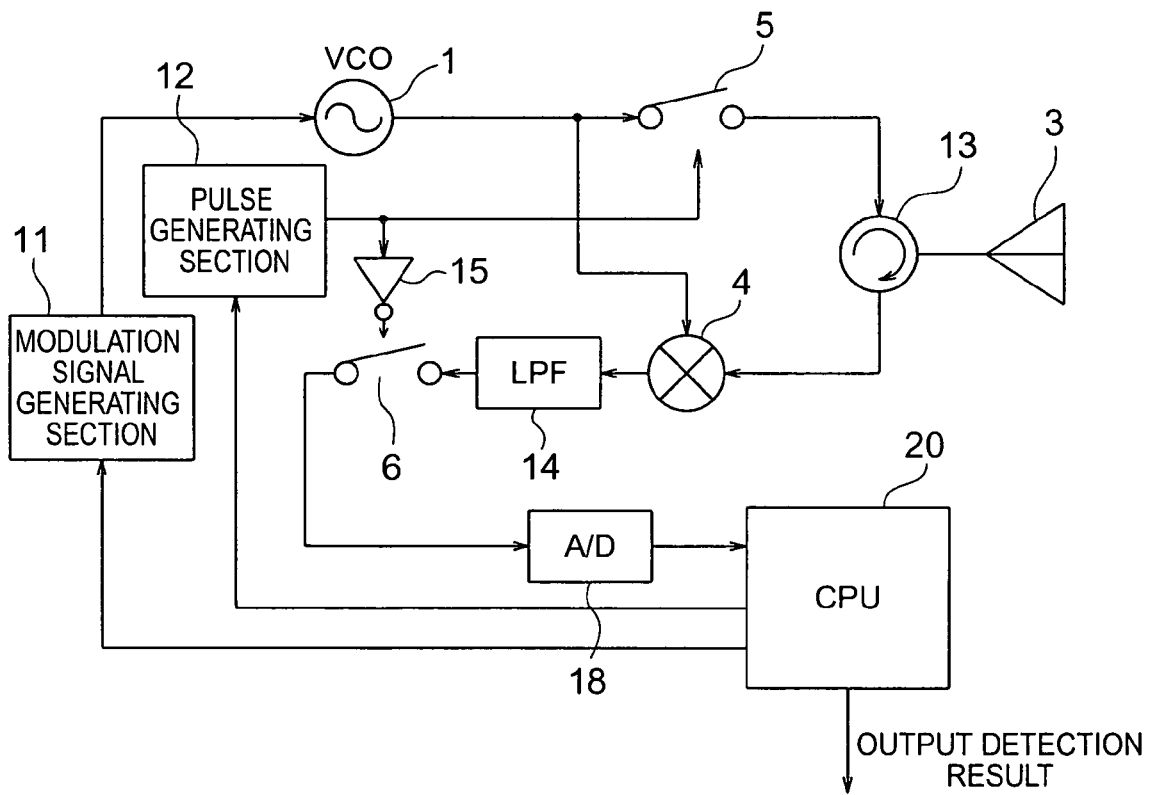
FIG. 1 is a block diagram showing a configuration of an in-vehicle pulse radar device according to a first embodiment of the present invention.

FIG. 1 is a block diagram showing a configuration of an in-vehicle pulse radar device according to a first embodiment of the present invention. The in-vehicle pulse radar device shown in FIG. 1 includes a modulation signal generating section 11 which outputs as a modulation signal a triangle wave similar to that used in general FMCW radars, and a voltage control oscillator (indicated by "VCO" in the drawings) 1 which outputs a transmission signal that is frequency-modulated in accordance with the modulation signal, both of which constitute a frequency modulating unit that changes the frequency of the transmission signal so as to rise and drop with time.

Further, the in-vehicle pulse radar device includes a transmission-side switch which is controlled to be on and off according to a pulse control signal generated by a pulse generating section 12 so as to convert a transmission signal output from the voltage control oscillator 1 to a transmission pulse wave, and a reception-side switch 6 constituting a reception control unit which is controlled to be on and off according to the pulse control signal that has passed through an inverter 15 which inverts the pulse control signal generated by the pulse generating section 12 so as to control the passing and blocking of a received signal in synchronization with the transmission pulse wave.

Further, the in-vehicle pulse radar device includes a circulator 13 serving as a transmission and reception connecting unit which supplies the transmission pulse wave that has passed through the transmission-side switch 5 to an integrated transmission and reception antenna 3 used for both transmission and reception, and allows a signal received by the transmission and reception antenna 3 to pass therethrough as a received signal; a mixer 4 which mixes the transmission signal output from the voltage control oscillator 1 and the received signal input through the circulator 13, and outputs a baseband received pulse; and a low pass filter (indicated by "LPF" in the drawings) 14 serving as a shaping unit which receives the baseband received pulse output from the mixer 4 and shapes the trailing edge of the baseband received pulse to be delayed.

Further, the in-vehicle pulse radar device includes an A/D converter 18 serving as a sampling unit which samples an output of the low pass filter 14 when a predetermined period of time elapses after the reception-side switch 6 serving as the reception control unit starts to pass the received signal therethrough; and a CPU 20 which receives a signal sampled by the A/D converter 18, extracts a beat frequency therefrom by using fast Fourier transform (FFT), calculates the distance to and the relative speed of a target object as in general FMCW radars, and outputs a detection result to an external device. It is needless to say that operations of the modulation signal generating section 11 and the pulse generating section 12 are controlled by the CPU 20.

Next, an operation of the in-vehicle pulse radar device shown in FIG. 1 will be described with reference to signal timing charts shown in FIGS. 2A to 2D. A triangle wave is output from the modulation signal generating section 11 similarly to general FMCW radars, and is input to the voltage control oscillator 1 as a modulation signal. The voltage control oscillator 1 outputs a transmission signal that is frequency-modulated in accordance with the modulation signal. The transmission signal output from the voltage control oscillator 1 is distributed and input to the transmission-side switch 5 and the mixer 4. The transmission-side switch 5 converts the transmission signal to a transmission pulse wave as shown in FIG. 2A in accordance with a pulse control signal generated by the pulse generating section 12. The transmission pulse wave is supplied to the transmission and reception antenna 3 through the circulator 13 to be transmitted toward a target object (not shown) as a radio wave.

The radio wave reflected by the target object is received by the transmission and reception antenna 3 and input as a received signal to the mixer 4 through the circulator 13. In the mixer 4' the transmission signal and the received signal are mixed and output as a baseband received pulse to the low pass filter 14. The low pass filter 14 outputs the baseband received pulse with its trailing edge being delayed as shown in FIG. 2C to the reception-side switch 6.

The reception-side switch 6 is so controlled through the inverter 15 as to operate in the phase reverse to that of the transmission-side switch 5, the operation of the reception-side switch 6 being shown in FIG. 2B. The reception-side switch 6 blocks a waveform portion 16 of the baseband received pulse shown in FIG. 2C, and allows only a waveform portion 17 thereof to pass therethrough and to be input to the A/D converter 18. At this time, as in conventional radar devices, a switching noise of the reception-side switch 6 is generated as shown in FIG. 2D, and superimposed on the baseband received pulse.

The A/D converter 18 performs sampling at a timing 19 shown in FIG. 2C after a period of time during which the switching noise is converged elapses, in order to avoid sampling of a portion disturbed by the switching noise. At this time, the trailing edge of the baseband received pulse is delayed by the low pass filter 14 so that the baseband received pulse can be detected even when sampling is performed after the switching noise is converged.

A signal sampled by the A/D converter 18 is input to the CPU 20 where a beat frequency is extracted by using the fast Fourier transform (FFT), and a distance to and a relative speed of a target object are calculated similarly to general FMCW radars; and a detection result is output to an external device (not shown).

Therefore, according to the first embodiment, it is possible to provide a low-cost in-vehicle pulse radar device in which isolation in a circuit does not need to be unnecessarily improved, and to appropriately detect a target object in a short distance without being affected by the switching noise generated by the reception control unit.

Further, the transmission antenna and the reception antenna are integrated so that a compact in-vehicle pulse radar device can be provided, whereby a vehicle design is not impaired.

With the provision of the circulator 13, a control signal for switching transmission and reception is unnecessary. Thus, a load of the CPU 20 is reduced, and more advanced signal processing can be performed.

Since the distance to a target object can be measured with higher precision, car-to-car distance control becomes more comfortable and a collision damage mitigation operation can also be appropriately performed.

Second Embodiment

Figure 3:
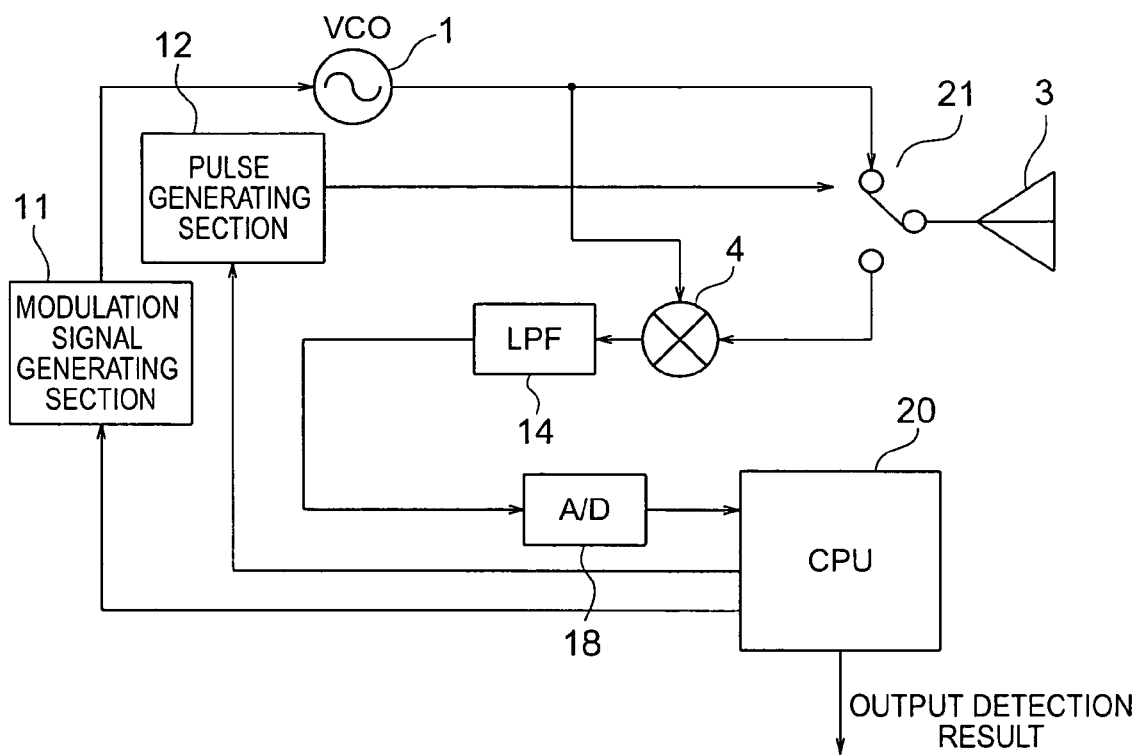
FIG. 3 is a block diagram showing a configuration of an in-vehicle pulse radar device according to a second embodiment of the present invention.

FIG. 3 is a block diagram showing a configuration of an in-vehicle pulse radar device according to a second embodiment of the present invention. The in-vehicle pulse radar device of the second embodiment shown in FIG. 3 is different from that of the first embodiment shown in FIG. 1 in that the transmission-side switch 5, the reception-side switch 6, the circulator 13, and the inverter 15 are replaced with a transmission and reception changeover switch 21. The other structures are the same as those in the in-vehicle pulse radar device of the first embodiment shown in FIG. 1. Thus, the same reference numerals are given to the same components, and descriptions thereof are omitted.

Next, an operation of the in-vehicle pulse radar device shown in FIG. 3 will be described with reference to signal timing charts shown in FIGS. 4A to 4C. Processes performed until the voltage control oscillator 1 outputs a transmission signal are the same as those of the first embodiment, so descriptions thereof are omitted here. The transmission signal output from the voltage control oscillator 1 is distributed and input to the transmission and reception changeover switch 21 and the mixer 4. The transmission and reception changeover switch 21 converts the transmission signal to a transmission pulse wave shown in FIG. 4A in accordance with a pulse control signal generated by the pulse generating section 12. The transmission pulse wave is supplied to the transmission and reception antenna 3 to be transmitted toward a target object (not shown) as a radio wave.

The radio wave reflected by the target object is received by the transmission and reception antenna 3 and input as a received signal to the mixer 4 through the transmission and reception changeover switch 21. In the mixer 4, the transmission signal and the received signal are mixed and output as a baseband received pulse to the low pass filter 14. The low pass filter 14 outputs the baseband received pulse with its trailing edge being delayed as shown in FIG. 4B to the A/D converter 18.

Figure 4:
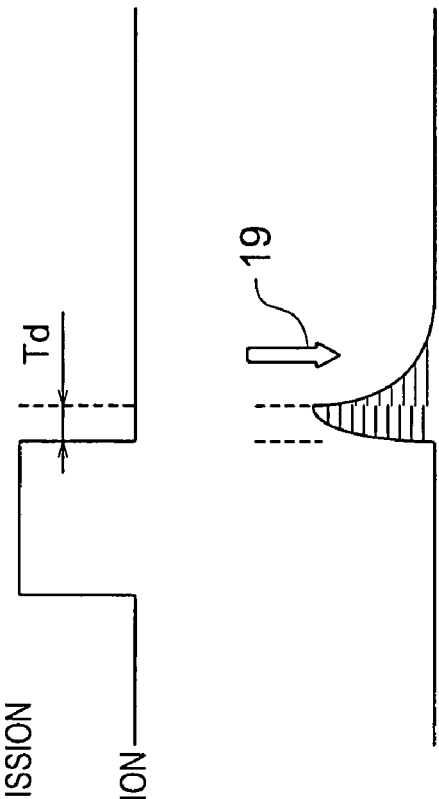
FIGS. 4A to 4C are waveform charts of a transmission and reception switch shown in FIG. 3, a received signal, and a switching noise.

In the second embodiment, similarly to the first embodiment, a switching noise is generated as shown in FIG. 4C, and superimposed on the baseband received pulse. However, the trailing edge of the baseband received pulse is delayed by the low pass filter 14, and the A/D converter 18 performs sampling at a timing 19 shown in FIG. 4B after the switching noise is converged. Thus, the baseband received pulse can be detected.

Processes performed after an output of the A/D converter 18 is input to the CPU 20 are the same as those of the first embodiment, and thus descriptions thereof are omitted here.

According to the second embodiment, the transmission and reception changeover switch 21 is used as a transmission antenna and a reception antenna, so that neither a transmission control unit nor a reception control unit is required, leading to a low cost and miniaturization.

Third Embodiment

Figure 5:
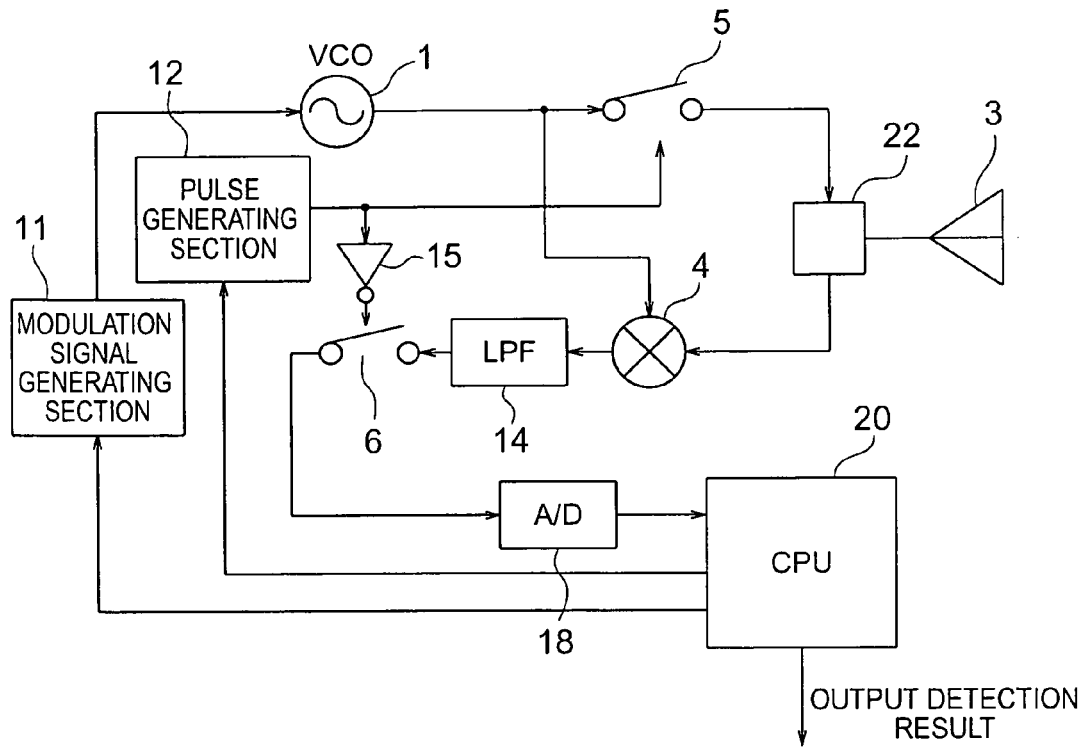
FIG. 5 is a block diagram showing a configuration of an in-vehicle pulse radar device according to a third embodiment of the present invention.

FIG. 5 is a block diagram showing a configuration of an in-vehicle pulse radar device according to a third embodiment of the present invention. The in-vehicle pulse radar device of the third embodiment shown in FIG. 5 is different from that of the first embodiment shown in FIG. 1 in that the circulator 13 serving as the transmission and reception connecting unit is replaced with a 90-degree hybrid circuit 22. The other structures are the same as those in the in-vehicle pulse radar device of the first embodiment shown in FIG. 1. Thus, the same reference numerals are given to the same components, and descriptions thereof are omitted.

In the third embodiment, the 90-degree hybrid circuit 22 is used to supply an output of the transmission-side switch 5 to the transmission and reception antenna 3 and to input a signal received by the transmission and reception antenna 3 to the mixer 4.

According to the third embodiment, the 90-degree hybrid circuit 22 can be configured in the same process as other transmission lines such as microstrip lines, and a part such as a ferrite element necessary for the circulator 13 is not required to be mounted. Therefore, the costs required for assembling can be reduced and the reliability can be improved.

Fourth Embodiment

Figure 6:
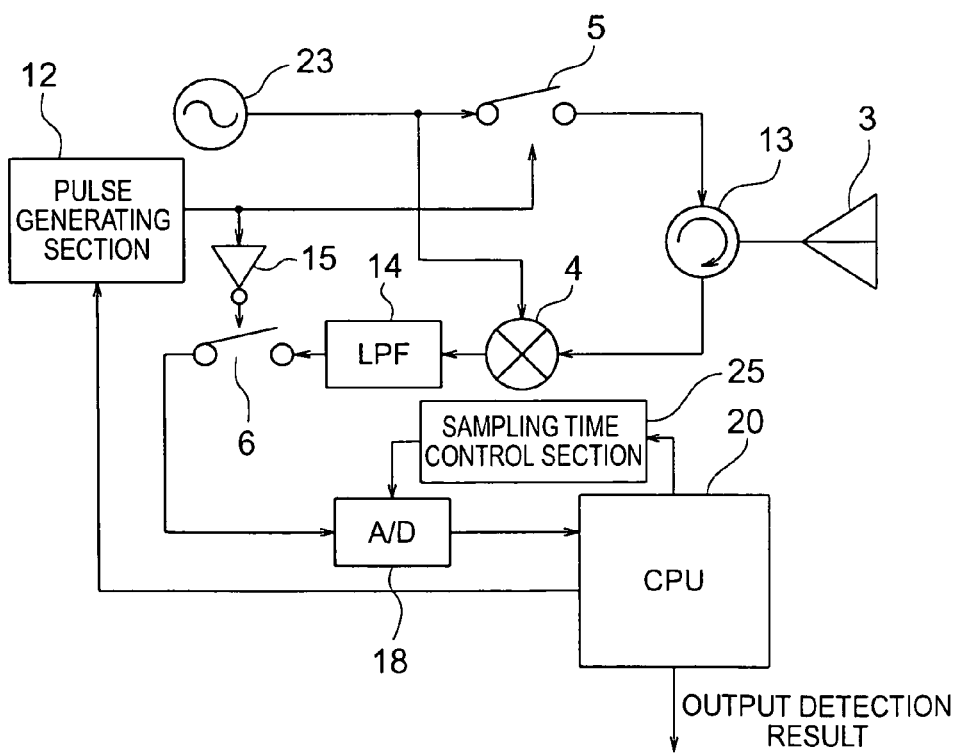
FIG. 6 is a block diagram showing a configuration of an in-vehicle pulse radar device according to a fourth embodiment of the present invention.

FIG. 6 is a block diagram showing a configuration of an in-vehicle pulse radar device according to a fourth embodiment of the present invention. The in-vehicle pulse radar device of the fourth embodiment shown in FIG. 6 is different from that of the first embodiment shown in FIG. 1 in that the modulation signal generating section 11 and the voltage control oscillator 1 are replaced with an oscillator 23 which outputs a transmission signal, and a sampling time control section 25 is further provided. The sampling time control section 25 sequentially changes the delay time of the A/D converter 18 serving as the sampling unit when a target object is detected. The delay time of the A/D converter 18, from the time when the reception-side switch 6 starts to pass a received signal therethrough to the time when the received signal is sampled, is variable. The other structures are the same as those in the in-vehicle pulse radar device of the first embodiment shown in FIG. 1. Thus, the same reference numerals are given to the same components, and descriptions thereof are omitted.

Next, an operation of the in-vehicle pulse radar device shown in FIG. 6 will be described with reference to FIGS. 2A to 2C and a waveform shown in FIG. 7. In FIG. 6, a transmission signal is output from the oscillator 23, and distributed and input to the transmission-side switch 5 and the mixer 4. The transmission-side switch 5 converts the transmission signal to a transmission pulse wave shown in FIG. 2A in accordance with a pulse control signal generated by the pulse generating section 12. The transmission pulse wave is supplied to the transmission and reception antenna 3 through the circulator 13 to be transmitted toward a target object (not shown) as a radio wave.

The radio wave reflected by the target object is received by the transmission and reception antenna 3 and input as a received signal to the mixer 4 through the circulator 13. In the mixer 4, the transmission signal and the received signal are mixed and output as a baseband received pulse to the low pass filter 14. The low pass filter 14 outputs the baseband received pulse with its trailing edge being delayed as shown in FIG. 2C to the reception-side switch 6. The reception-side switch 6 is so controlled through the inverter 15 as to operate in the phase reverse to that of the transmission-side switch 5, the operation of the reception-side switch 6 being shown in FIG. 2B. The reception-side switch 6 blocks the waveform portion 16 of the baseband received pulse shown in FIG. 2C, and allows the waveform portion 17 thereof to pass therethrough and input to the A/D converter 18.

The A/D converter 18 performs sampling at the timing 19 shown in FIG. 2C after a period of time during which the switching noise is converged elapses, in order to avoid sampling of a portion distributed by the switching noise. At this time, the trailing edge of the baseband received pulse is delayed by the low pass filter 14 so that the baseband received pulse can be detected even when the sampling is performed after the switching noise is converged.

Based on a signal sampled by the A/D converter 18, the CPU 20 judges the presence or absence of the target object. Specifically, the CPU 20 judges that the target object exists when this magnitude of the sampled signal exceeds a predetermined threshold.

Figure 7:
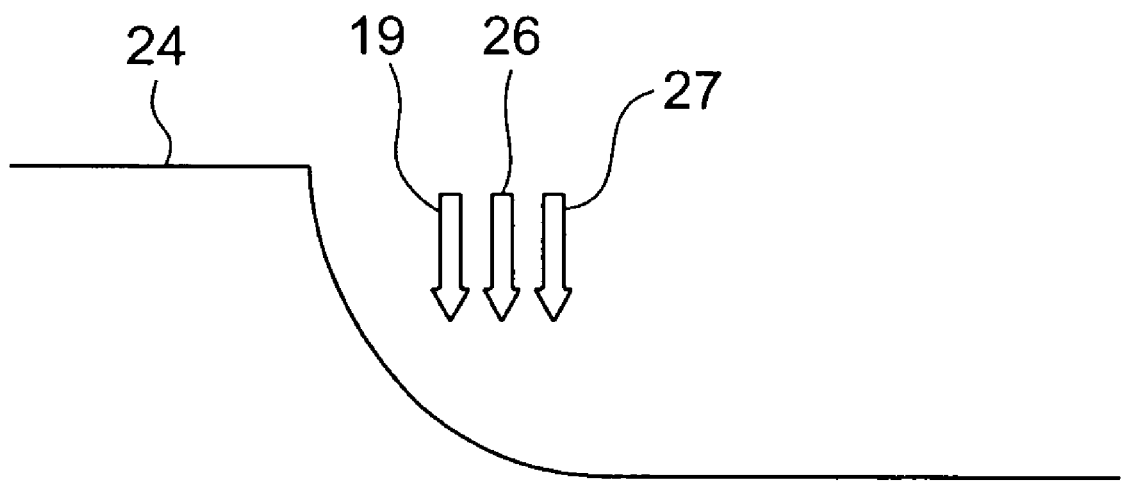
FIG. 7 is a diagram showing a change in sampling timing in the fourth embodiment of the present invention.

Referring to FIG. 7, a sampling operation in the fourth embodiment will be described in detail. In FIG. 7, reference numeral 24 indicates a baseband received pulse. When a target object is not detected, sampling is performed at the timing 19 shown in FIG. 7. When a target object is once detected, the CPU 20 controls the sampling time control section 25 to change the sampling time to a timing 26 shown in FIG. 7. The sampling time is further changed to a timing 27 shown in FIG. 7 at the next sampling, and sampling is performed at the timing 27.

In this way, sampling is performed by sequentially changing the sampling timing, so that the changes with time of the baseband received pulse that is shaped by the low pass filter 14 can be observed. Since the response time of the low pass filter 14 is known, it is obvious that a time Td which is required for a radio wave to reach and return from a target object can be measured by comparing the response time of the low pass filter 14 with the observed change with time of the baseband received pulse wave. Therefore, a distance to the target object can be precisely measured.

According to the fourth embodiment, a distance to the target object can be measured with high precision and in a short time without sequentially changing the sampling delay time.

What is claimed is:

1. A pulse radar device comprising:
    a conversion means for converting a transmission signal to a transmission pulse wave by use of a predetermined on time and off time;
    a transmission means for transmitting the transmission pulse wave from a transmission antenna toward a target object;
    a reception antenna which receives a signal reflected by the target object;
    calculation means for calculating a distance to the target object based on a delay time between the transmission pulse wave and the signal received by the reception antenna;
    reception control means for controlling passing and blocking of the received signal in synchronization with the transmission pulse wave;
    shaping means for shaping a trailing edge of a pulse wave of the received signal to be delayed; and
    sampling means for sampling the received signal when a predetermined period of time elapses after the reception control means starts to pass the received signal therethrough.

2. The pulse radar device according to claim 1, further comprising transmission and reception connecting means, wherein:
    the transmission antenna and the reception antenna constitute an integrated transmission and reception antenna used for both transmission and reception; and
    the transmission and reception connecting means supplies the transmission pulse wave to the transmission and reception antenna, and allows a signal received by the transmission and reception antenna to pass therethrough as the received signal.

3. The pulse radar device according to claim 2, wherein the transmission and reception connecting means comprises a circulator.

4. The pulse radar device according to claim 2, wherein the reception control means and the transmission and reception connecting means are configured by a transmission and reception changeover switch.

5. The pulse radar device according to claim 2, wherein the transmission and reception connecting means comprises a 90-degree hybrid coupler.

6. The pulse radar device according to claim 1, further comprising frequency modulating means for changing a frequency of the transmission signal to rise or drop with time.

7. The pulse radar device according to claim 1, further comprising sampling time control means, wherein a delay time of the sampling means, from a time when the reception control means starts to pass the received signal therethrough to a time the received signal is sampled, is variable; and
    wherein the sampling time control means sequentially changes the delay time of the sampling means when the target object is detected.

8. A pulse radar device comprising:
    a reception control means which controls passing and blocking of a received signal in synchronization with a transmission pulse wave, the received signal being a reflection of a transmission pulse wave reflected from a target object;
    a shaping means which shapes a trailing edge of a pulse wave of the received signal by delaying the trailing edge;
    a sampling means which samples the received signal when a predetermined period of time elapses after the reception control means starts to pass the received signal therethrough; and
    a distance calculating means which calculates a distance to the target object based on a delay time between the transmission pulse wave and the received signal.

9. The pulse radar device according to claim 8, wherein a transmission signal is converted to the transmission pulse wave by use of a predetermined on time and off time and the transmission pulse wave is transmitted towards the target object.

* * * * *